(12) United States Patent
Fujiwara et al.

(10) Patent No.: US 11,579,454 B2
(45) Date of Patent: Feb. 14, 2023

(54) IMAGE DISPLAY DEVICE AND REBOOT METHOD FOR IMAGE DISPLAY DEVICE

(71) Applicant: SEIKO EPSON CORPORATION, Tokyo (JP)

(72) Inventors: Takehiro Fujiwara, Matsumoto (JP); Wataru Sakuma, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/705,414

(22) Filed: Mar. 28, 2022

(65) Prior Publication Data
US 2022/0308351 A1    Sep. 29, 2022

(30) Foreign Application Priority Data

Mar. 29, 2021   (JP) .............................. JP2021-054806

(51) Int. Cl.
*G02B 27/01*    (2006.01)
*G06F 3/01*    (2006.01)

(52) U.S. Cl.
CPC .......... *G02B 27/0172* (2013.01); *G06F 3/011* (2013.01); *G02B 2027/014* (2013.01)

(58) Field of Classification Search
None
See application file for complete search history.

(56) References Cited

U.S. PATENT DOCUMENTS

2019/0361251 A1    11/2019   Iwatsu et al.
2022/0179213 A1*   6/2022    Zhou ....................... H02J 50/90

FOREIGN PATENT DOCUMENTS

WO    2018135135    7/2018

* cited by examiner

*Primary Examiner* — Chad M Dicke
(74) *Attorney, Agent, or Firm* — JCIPRNET

(57) ABSTRACT

A HMD including an image display that notifies detection of an abnormality, a DP six-axis sensor that detects whether the image display unit is mounted, and a DP control unit that executes a first reboot mode for rebooting the HMD in accordance with a first order when mounting of the image display unit is not detected and the abnormality of the HMD is detected, and a second reboot mode for rebooting the HMD in accordance with a second order when mounting of the image display unit is detected and the abnormality of the HMD is detected. An order of reboot of the image display unit in the second order is set before an order of reboot of the image display unit in the first order.

9 Claims, 5 Drawing Sheets

IMAGE DISPLAY DEVICE AND REBOOT METHOD FOR IMAGE DISPLAY DEVICE

The present application is based on, and claims priority from JP Application Serial Number 2021-054806, filed Mar. 29, 2021, the disclosure of which is hereby incorporated by reference herein in its entirety.

BACKGROUND

1. Technical Field

The present disclosure relates to an image display device and a reboot method for the image display device.

2. Related Art

Recently, an image display device is known that detects an error of a device and executes processing corresponding to the detected error.

For example, a see-through display device disclosed in WO2018/135135 adjusts a brightness of the see-through display, transmittance of a dimming element, a display position, size, etc. of a display image based on a level of the detected error.

However, in a case where an abnormality occurs in the image display device, the display of the image display device may be disappear, and the display may be restored after the image display device is rebooted. In such a case, when it takes time for the display to be restored, it may cause a user to difficulty.

SUMMARY

An aspect for solving the above-described problem is an image display device mounted on a head of a user, the device including a notification unit that notifies detection of an abnormality in the image display device; a detection unit that detects whether the image display device is mounted on the head of the user; and a control unit that executes a first mode and a second mode, the first mode being a mode for rebooting the image display device in accordance with a first order when the image display device is not mounted and the image display device has the abnormality, and the second mode being a mode for rebooting the image display device in accordance with a second order when the image display device is mounted and the image display device has the abnormality, wherein an order in which the notification notification unit is rebooted in the second order is earlier than an order in which the notification unit is rebooted in the first order. order.

An aspect for solving the above-described problem is an image display device mounted on a head of a user, the device including a notification unit that notifies detection of an abnormality in the image display device; a detection unit that detects whether the image display device is mounted on the head of the user; and a control unit that executes a first mode and a second mode, the first mode being a mode for rebooting the image display device in accordance with a first order when the image display device is not mounted and the image display device has the abnormality, and the second mode being a mode for rebooting the image display device in accordance with a second order when the image display device is mounted and the image display device has the abnormality, wherein time until which the notification unit is rebooted in the first order is longer than time until which the notification unit is rebooted in the second order.

An aspect for solving the above-described problem is a control method for an image display device, the method including detecting an abnormality in a notification unit that notifies the abnormality; detecting whether the image display device is mounted; rebooting the image display device in accordance with a first order when the notification unit has the abnormality and the image display device is not mounted; and rebooting the image display device in accordance with a second order when the notification unit has the abnormality and the image display device is mounted, and time until which the notification unit is rebooted in the second order being earlier than time until which the notification unit is rebooted in the first order.

An aspect for solving the above-described problem is a control method for an image display device, the method including detecting an abnormality in the image display device mounted on a head of a user, detecting that the image display device is mounted on the head of the user, rebooting the image display device in accordance with a first order when an abnormality of the image display device is detected and mounting of the image display device is not detected, and rebooting the image display device in accordance with a second order in which a time interval until reboot of a notification unit configured to notify that an abnormality occurs in the image display device is shorter than a time interval of the first order when an abnormality of the image display device is detected and mounting of the image display device is detected.

DESCRIPTION OF EXEMPLARY EMBODIMENTS

1. Display System Configuration

Figure 1:
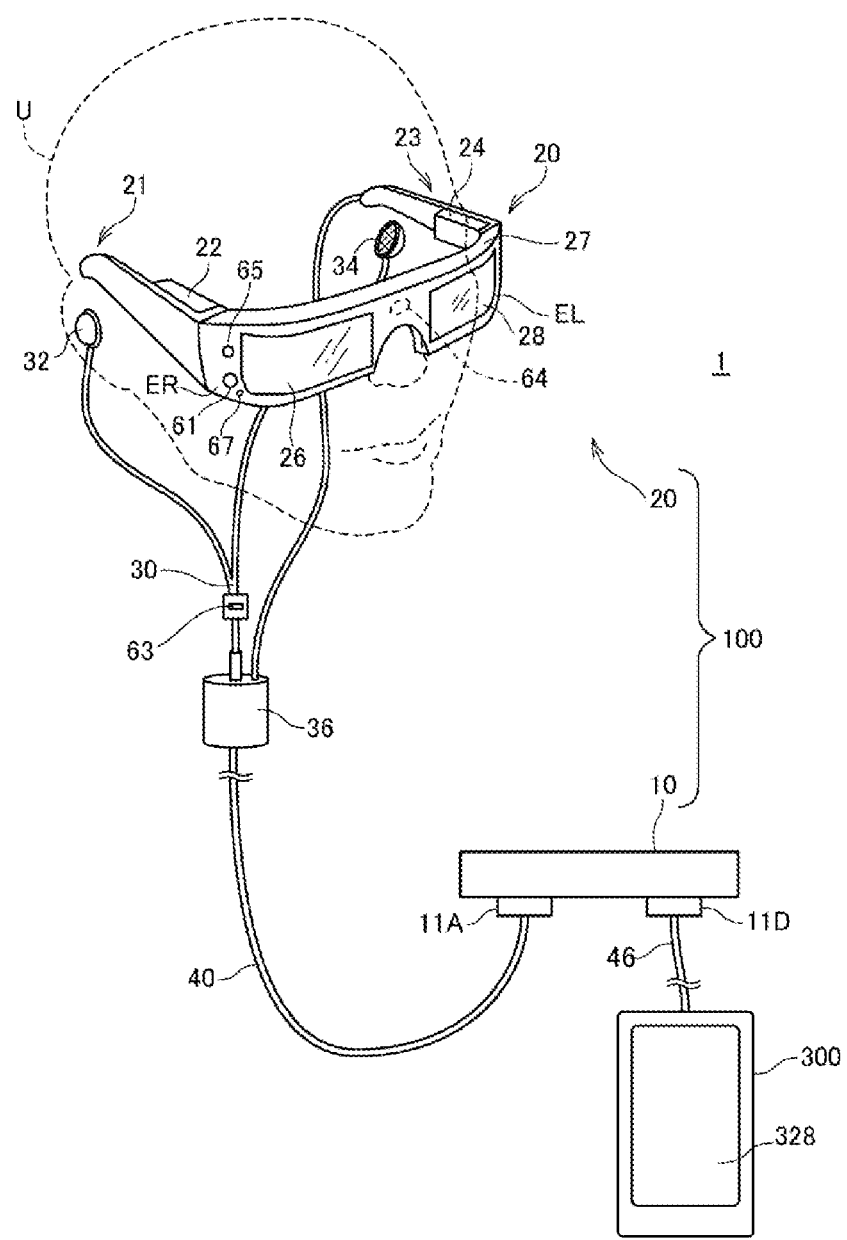
FIG. 1 is a diagram illustrating a schematic configuration of a display system.

FIG. 1 is a diagram illustrating a schematic configuration of a display system 1.

The display system 1 includes an HMD 100 corresponding to an image display device and a control device 300. The HMD 100 is a head-mounted display apparatus including an image display unit 20 mounted on a head of a user U to allow the user to view an image and a video. The HMD is an abbreviation for Head Mounted Display.

The HMD 100 includes a coupling device 10 coupled to the image display unit 20. The coupling device 10 functions as an interface for coupling the HMD 100 to a device different from the HMD 100. In the display system 1, the control device 300 is coupled to the coupling device 10.

In the following description and drawings, for the sake of convenience of description, the name of some function units constituting the HMD 100 is denoted by the prefix DP, and the name of some function units constituting the control device 300 is denoted by the prefix CO.

The control device 300 includes a display screen that displays characters and images, and a touch panel 328 that functions as an operation unit for detecting touch operation and pressing operation, and is a portable size terminal device, and can use, for example, a smart phone. The control device 300 may be a desktop personal computer, a notebook personal computer, a tablet personal computer, etc.

The coupling device 10 includes a connector 11*a* and a connector 11*d* in a box shaped case. The image display unit 20 is coupled to the connector 11*a* via a coupling cable 40, and the control device 300 is coupled to the connector 11*d* via a USB cable 46. As a result, the image display unit 20 and the control device 300 are coupled to each other so that data can be transmitted and received. For example, the control device 300 outputs video data for the image display unit 20 to display video, and outputs the sound data to the image display unit 20. For example, the image display unit 20 transmits detection data for various sensors included in the image display unit 20 to the control device 300. The control device 300 may be capable of supplying power to the image display unit 20. The USB is an abbreviation for Universal Serial Bus.

The configuration of coupling the coupling device 10 and the control device 300 using the USB cable 46 is merely an example, and the specific coupling form of the coupling device 10 and the control device 300 is not limited. For example, other types of cables may be used to couple over a wire or via wireless communication. For example, in a configuration in which the USB cable 46 is coupled to the connector 11*d* of a USB-Type C standard, 20 volts DC current can be supplied by the USB cable 46, and HDMI standard video data, etc. can be transmitted as a function of the alternative mode of a USB-Type C. HDMI is a registered trademark.

The image display unit 20 includes a main body including a right holding part 21, a left holding part 23, and a front frame 27. The main body further includes a right display unit 22, a left display unit 24, a right light-guiding plate 26, and a left light-guiding plate 28.

The right holding part 21 and the left holding part 23 extend rearward from corresponding ends of the front frame 27, to hold the image display unit 20 on the head of the user U. The right holding part 21 is coupled to an end ER located on the right side of the user U in the front frame 27, and the left holding part 23 is coupled to an end EL located on the left side of the user U.

The right light-guiding plate 26 and the left light-guiding plate 28 are provided at the front frame 27. The right light-guiding plate 26 is located in front of the right eye of the user in a state where the user wears the image display unit 20, and causes the user to visually recognize an image with the right eye. The left light-guiding plate 28 is located in front of the left eye of the user in a state where the user wears the image display unit 20, and causes the user to visually recognize an image with the left eye. The right light-guiding plate 26 and the left light-guiding plate 28 are optical parts formed of a light transmissive resin, etc., and are configured to guide imaging light output by the right display unit 22 and the left display unit 24 to the eyes of the user. The right light-guiding plate 26 and the left light-guiding plate 28 are, for example, prisms.

The front frame 27 has a shape formed by coupling an end of the right light-guiding plate 26 and an end of the left light-guiding plate 28 to each other, and this coupling position corresponds to a position between eyebrows of the user in a state where the user wears the image display unit 20. The front frame 27 may include a nose pad portion abutting the nose of the user U in the wearing state of the image display unit 20, and may be configured to couple a belt to the right holding part 21 and the left holding part 23 to hold the image display unit 20 to the head of the user U by the belt.

Each of the right display unit 22 and the left display unit 24 is a module obtained by unitizing an optical unit and a peripheral circuit. The right display unit 22 displays an image by the right light-guiding plate 26, and the left display unit 24 displays an image by the left light-guiding plate 28. The right display unit 22 is provided at the right holding part 21 and the left display unit 24 is provided at the left holding part 23.

The imaging light guided by the right light-guiding plate 26 and the outside light transmitted through the right light-guiding plate 26 are incident on the right eye of the user U. Similarly, the imaging light guided by the left light-guiding plate 28 and the outside light transmitted through the left light-guiding plate 28 are incident on the left eye. The imaging light from the right light-guiding plate 26 and the left light-guiding plate 28 and the outside light transmitted through the right light-guiding plate 26 and the left light-guiding plate 28 are incident on the eye of the user U. As a result, the user U views the image displayed by the image display unit 20 overlaid on the image transmitted through the right light-guiding plate 26 and the left light-guiding plate 28.

A DP illuminance sensor 65 is arranged at the front frame 27. The DP illuminance sensor 65 is a sensor that receives outside light coming from the front of the user U who wears the image display unit 20. The DP illuminance sensor 65 can detect the illumination and the amount of the outside light incident on the eye of the user U by transmitting through the right light-guiding plate 26 and the left light-guiding plate 28.

A DP outer camera 61 is provided at the front frame 27 and positioned so that the camera 61 does not block the outside light transmitted through the right light-guiding plate 26 and the left light-guiding plate 28. The DP outer camera 61 is a digital camera including an image capturing element, an image capturing lens, etc., and may be a monocular camera or a stereo camera. The angle of view of the DP outer camera 61 includes at least a portion of the range of the outside scene that the user U wearing the image display unit 20 sees through the right light-guiding plate 26 and the left light-guiding plate 28. The DP outer camera 61 may be a wide angle camera and may be capable of capturing the entire outside scene viewed by the user U wearing the image display unit 20. CCD is an abbreviation for Charge Coupled Device, and CMOS is an abbreviation for Complementary Metal Oxide Sensor.

An LED indicator 67 that lights up during the operation of the DP outer camera 61 is arranged at the front frame 27.

The front frame 27 is provided with a distance sensor 64 that detects a distance to a target object located in a preset measurement direction. The distance sensor 64 is, for example, a light reflective distance sensor using an LED, a laser diode, etc., an infrared depth sensor, an ultrasonic distance sensor, or a laser range scanner. The distance sensor 64 may be a distance detection unit that combines image detection and sound detection, or a device that processes an image obtained by stereo imaging by a camera to detect a distance. The measurement direction of the distance sensor 64 is, for example, the direction of the outside scene viewed by the user U through the right light-guiding plate 26 and the left light-guiding plate 28.

The right display unit 22 and the left display unit 24 are each coupled to the coupling device 10 by the coupling cable 40. The coupling cable 40 includes an audio connector 36. A headset 30 having a right earphone 32 and a left earphone 34 constituting a stereo headphone and a microphone 63 are coupled to the audio connector 36. The right earphone 32 and the left earphone 34 output a sound based on a sound signal output from the coupling device 10. The microphone 63 is configured to collect a sound and outputs the sound signal to the coupling device 10.

2. Configuration of the Optical System of the Image Display Unit

Figure 2:
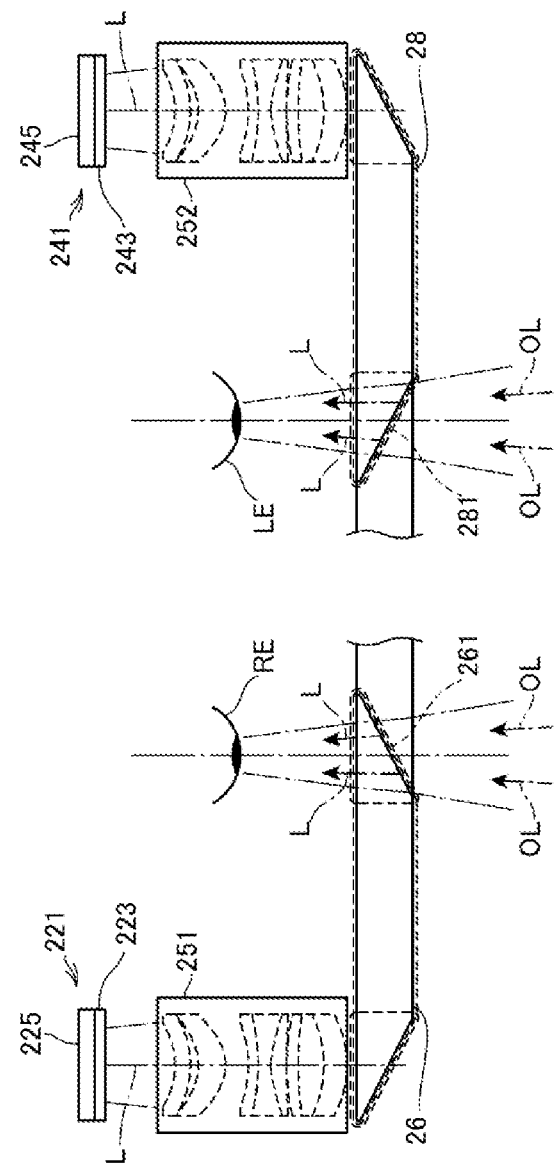
FIG. 2 is a plan view of a main part illustrating a configuration of an optical system of an image display unit.

FIG. 2 is a plan view of a main part illustrating a configuration of an optical system of an image display unit 20. In FIG. 2, a left eye LE and a right eye RE of a user are illustrated for explanation.

The right display unit 22 and the left display unit 24 are configured to be left-right symmetrical, for example.

As a configuration to make the image visible to the right eye RE, the right display unit 22 includes an OLED unit 221 that emits imaging light and a right optical system 251 that guides the imaging light L emitted by the OLED unit 221 to the right light-guiding plate 26. OLED is an abbreviation for Organic Light Emitting Diode.

Figure 3:
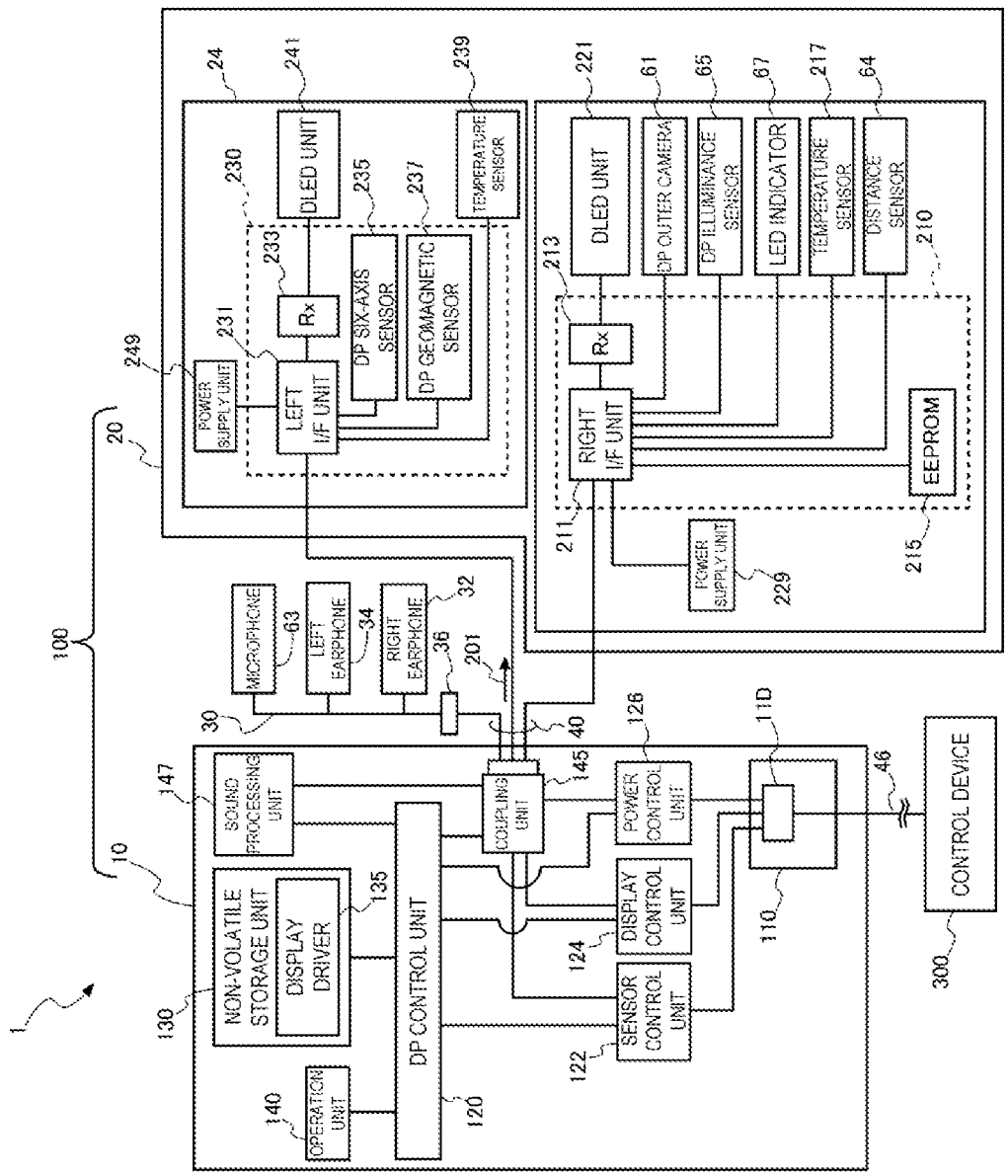
FIG. 3 is a block diagram of the display system.

The OLED unit 221 includes an OLED panel 223 and an OLED drive circuit 225 configured to drive the OLED panel 223. The OLED panel 223 is a self-luminous display panel in which, for example, a light emitting element that emit colored light of R, G, and B is disposed. The OLED drive circuit 225 drives the OLED panel 223 in accordance with the control of a DP control unit 120. The OLED drive circuit 225 is mounted on a substrate (not illustrated) secured to the back surface of the OLED panel 223, for example, and a temperature sensor 217 illustrated in FIG. 3 is mounted on the substrate.

The right optical system 251 converts the imaging light L emitted from the OLED panel 223 into a light flux in a parallel state by a collimating lens, and causes the imaging light L to be incident on the right light-guiding plate 26. The imaging light L is reflected by a plurality of reflection surfaces within the right light-guiding plate 26, and is reflected by a half mirror 261 located in front of the right eye RE, and emitted from the right light-guiding plate 26 toward the right eye RE.

As a configuration to make the image visible to the left eye LE, the right display unit 22 includes an OLED unit 241 that emits imaging light and a left optical system 252 that guides the imaging light L emitted by the OLED unit 241 to the left light-guiding plate 28.

The OLED unit 241 includes an OLED panel 243, and an OLED drive circuit 245 configured to drive the OLED panel 243. The OLED panel 243 is a self-luminous display panel in which, for example, a light emitting element that emit colored light of R, G, and B is disposed. The OLED drive circuit 245 drives the OLED panel 243 in accordance with the control of the DP control unit 120. The OLED drive circuit 245 is mounted on a substrate (not illustrated) secured to the back surface of the OLED panel 243, for example, and a temperature sensor 239 illustrated in FIG. 3 is mounted on the substrate.

The left optical system 252 converts the imaging light L emitted from the OLED panel 243 into a light flux in a parallel state by a collimating lens, and causes the imaging light L to be incident on the left light-guiding plate 28. The imaging light L is reflected by the plurality of reflection surfaces within the left light-guiding plate 28, and is reflected by the half mirror 261 located in front of the eye of the left eye LE and emitted from the left light-guiding plate 28 toward the left eye LE.

The HMD 100 functions as a transmissive display device. Namely, the imaging light L reflected by the half mirror 261 and outside light OL having transmitted through the right light-guiding plate 26 enter the right eye RE of the user. Additionally, the imaging light L reflected by the half mirror 281 and the outside light OL having transmitted through the half mirror 281 enter the left eye LE. The HMD 100 superimposes the imaging light L of the internally processed image and the outside light OL and causes them to be incident on the eye of the user U. This allows the user U to see the outside view through the right light-guiding plate 26 and the left light-guiding plate 28, and the image by the imaging light L is visually recognized by superimposing the outside view. The half mirrors 261, 281 are image extraction units that reflect the imaging light output by the right display unit 22 and the left display unit 24 to extract an image, and constitute a display unit.

3. HMD Control System

FIG. 3 is a block diagram of the display system 1, and in particular, illustrating the configuration of the HMD 100 in detail.

In the image display unit 20, the right display unit 22 has a right display unit substrate 210. At the right display unit substrate 210, a right I/F unit 211 coupled to the coupling cable 40, a receiving unit 213 that receives data input from the coupling device 10 via the right I/F unit 211, and an EEPROM 215 are mounted. The right I/F unit 211 couples the receiving unit 213, the EEPROM 215, the temperature sensor 217, the DP outer camera 61, the distance sensor 64, the DP illuminance sensor 65, and the LED indicator 67 to the coupling device 10. The receiving unit 213 couples the OLED unit 221 to the coupling device 10. The EEPROM is an abbreviation for Electrically Erasable Programmable Read-Only Memory. Also, the receiving unit 213 may be described as Rx213.

The left display unit 24 includes a left display unit substrate 230. At the left display unit substrate 230, a left I/F unit 231 coupled to the coupling cable 40, a receiving unit 233 that receives data input from the coupling device 10 via the left I/F unit 231 are mounted. A DP six-axis sensor 235 and a DP magnetic sensor 237 are mounted on the left display unit substrate 230.

The left I/F unit 231 couples the receiving unit 233, the DP six-axis sensor 235, the DP magnetic sensor 237, and the temperature sensor 239 to the coupling device 10. The receiving unit 233 couples the OLED unit 241 to the coupling device 10. Further, the left I/F unit 231 can have the same function as the right I/F unit 211. That is, the left I/F unit 231 couples the receiving unit 213, the EEPROM 215, the temperature sensor 217, the DP outer camera 61, the distance sensor 64, the DP illuminance sensor 65, and the LED indicator 67 to the coupling device 10. In this case, the right I/F unit 211 couples the receiving unit 233, the DP six-axis sensor 235, the DP magnetic sensor 237, and the temperature sensor 239 to the coupling device 10. In addition to this, in the sensor and configuration in which the right I/F unit 211 is coupled to the coupling device 10, the left I/F unit 231 can also be coupled to the coupling device 10 instead of the right I/F unit 211. Also, the receiving unit 233 may be described as Rx233.

The EEPROM 215 is configured to store various types of data in a non-volatile manner. The EEPROM 215 stores, for example, data about light-emitting properties and display properties of the OLED units 221, 241 provided at the image display unit 20, and data about a property of a sensor provided at the right display unit 22 or the left display unit 24. Specifically, the DP control unit 120 readablely stores parameters related to gamma correction of the OLED units 221, 241 and data for compensating for the detection values of the temperature sensors 217, 239.

The DP outer camera 61 performs imaging in accordance with a signal input via the right I/F unit 211, and outputs captured image data to the right I/F unit 211. The DP illuminance sensor 65 is configured to receive the outside light and output a detection value corresponding to an amount of the received light or an intensity of the received light. The LED indicator 67 is configured to light up in accordance with a control signal or a driving current input via the right I/F unit 211.

The temperature sensor 217 is configured to detect a temperature of the OLED unit 221, and outputs a voltage value or a resistance value corresponding to the detected temperature as a detection value.

The distance sensor 64 outputs a signal indicating the detection result of detecting the distance to the coupling device 10 via the right I/F unit 211.

The receiving unit 213 receives the video data for display transmitted from the coupling device 10 via the right I/F unit 211, and outputs the video data for display to the OLED unit 221. The OLED unit 221 displays an image based on the image data transmitted by the coupling device 10.

The receiving unit 233 receives the video data for display transmitted from the coupling device 10 via the left I/F unit 231 and outputs the video data for display to the OLED unit 241. The OLED unit 221, 241 display an image based on the image data transmitted by the coupling device 10.

The DP six-axis sensor 235 is a motion sensor including a three-axis acceleration sensor and a three-axis gyro sensor. The DP magnetic sensor 237 is a three-axis geomagnetic sensor, for example. The DP six-axis sensor 235 and the DP magnetic sensor 237 may be an IMU in which each of the above sensors is modularized, or may be a module in which the DP six-axis sensor 235 and the DP magnetic sensor 237 are integrated. The IMU is an abbreviation for Inertial Measurement Unit. The temperature sensor 239 detects the temperature of the OLED unit 241. The DP six-axis sensor 235, the DP magnetic sensor 237, and the temperature sensor 239 each output the detection value to the coupling device 10.

Each component of the image display unit 20 operates with power supplied from the coupling device 10 via the coupling cable 40. The image display unit 20 includes a power supply unit 229 on the right display unit 22, and a power supply unit 249 on the left display unit 24. The power supply unit 229 is configured to distribute and supply the power supplied by the coupling device 10 via the coupling cable 40 to each part of the right display unit 22 including the right display unit substrate 210. The power supply unit 249 is configured to distribute and supply the power supplied by the coupling device 10 via the coupling cable 40 to each part of the left display unit 24 including the left display unit substrate 230. The power supply units 229, 249 may include a conversion circuit, etc. that converts voltage. The power supply units 229, 249 correspond to the power supply unit together with a power control unit 126.

The coupling device 10 includes an I/F unit 110, a DP control unit 120, a sensor control unit 122, a display control unit 124, a power control unit 126, a non-volatile storage unit 130, an operation unit 140, a coupling unit 145, and a sound processing unit 147.

The I/F unit 110 includes a connector 11D and an interface circuit that executes a communication protocol conforming to various communication standards. The I/F unit 110 is, for example, an interface substrate on which a connector 11D and the interface circuit are mounted. The I/F unit 110, for example, may include an interface for a memory card capable of being coupled with an external storage device or storage medium, etc., or the I/F unit 110 may include a radio communication interface.

The DP control unit 120 includes a processor such as a CPU and a microcomputer, and the processor executes a program to control each unit of the coupling device 10. The DP control unit 120 may include a RAM constituting a work area of the processor. The RAM is an abbreviation for Random Access Memory.

The DP control unit 120 is coupled to the non-volatile storage unit 130, the operation unit 140, the coupling unit 145, and the sound processing unit 147. The non-volatile storage unit 130 is a ROM that stores programs and data executed by the DP control unit 120 in a non-volatile manner. The ROM is an abbreviation for Read Only Memory. The non-volatile storage unit 130 stores a device driver including a display driver 135.

The sensor control unit 122 operates a sensor group included in the image display unit 20. The sensor group includes the DP outer camera 61, the distance sensor 64, the DP illuminance sensor 65, the temperature sensor 217, the DP six-axis sensor 235, the DP magnetic sensor 237 and the temperature sensor 239. the sensor control unit 122 is configured to perform setting and initialization of a sampling period of each sensor according to control of the DP control unit 120, and execute energization to each sensor, transmission of control data, acquisition of detection values, etc., in correspondence to the sampling period of each sensor.

The sensor control unit 122 outputs detection data indicative of the detection value and the detection result of each sensor to the I/F unit 110 at a preset timing. Here, the captured image data of the DP outer camera 61 is referred to as detection data in the same manner as the detection value and detection result of the other sensors.

The sensor control unit 122 may include an A/D converter that converts the analog signal into digital data. In this case, the sensor control unit 122 converts the detection value acquired from the sensor of the image display unit 20 and the analog signal of the detection result into detection data and outputs the detection data. The sensor control unit 122 may acquire the detection value and the digital data of the detection result from the sensor of the image display unit 20, and output the detection data to the I/F unit 110 by performing a conversion of the data format, adjustment of the output timing, etc.

By the operation of the sensor control unit 122, the control device 300 coupled to the I/F unit 110 can acquire the detection value of each sensor of the HMD 100 and the captured image data of the DP outer camera 61.

The sensor control unit 122 may output the result of arithmetic processing based on the detection value of each of the above-mentioned sensors as detection data. For example, the sensor control unit 122 may integrally process the detection value and detection result of a plurality of sensors and function as a so-called sensor fusion processing unit. In this case, the sensor control unit 122 may generate detection data for a virtual sensor not included in each sensor of the image display unit 20 by the sensor fusion. For example, the sensor control unit 122 may output, as detection data, trajectory data indicating the trajectory of movement of the image display unit 20, coordinate data indicating a position of the image display unit 20 in the three-dimensional space, and directional data indicating the direction of the image display unit 20. Here, the coordinate data may be data indicating relative coordinates with respect to the position of the coupling device 10, or may be data indicating a position with respect to a reference position set in the space in which the image display unit 20 is present. The direction data may be data indicating a direction based on a position and a direction of the coupling device 10, or may be data indicating a direction with respect to a reference position set in the space in which the image display unit 20 is present.

The sensor control unit 122 executes a communication protocol between the connector 11d and the device coupled by the USB cable 46, and outputs the detection data.

The display control unit 124 executes various kinds of processing for displaying an image on the image display unit 20 based on the video data included in the playback signal input to the I/F unit 110 or the display data. In the present exemplary embodiment, the video data is transmitted in an alternative mode of the USB-Type C through the connector 11D constituted by the USB-Type C connector. For example, the display control unit 124 is configured to execute various kinds of processing such as cutting out of a frame, resolution conversion, scaling, intermediate frame generation, and frame rate conversion, etc. The display control unit 124 outputs the video data corresponding to the OLED units 221, 241 to the coupling unit 145. The video data input to the coupling unit 145 is transmitted from the connector 11A to the right I/F unit 211 and the left I/F unit 231 as a video signal 201. The display control unit 124 adjusts and changes the display state of the image display unit 20 in accordance with the display control data input to the I/F unit 110.

At least one of the sensor control unit 122 and the display control unit 124 may be realized by the cooperation of software and hardware by executing a program by the processor. That is, the sensor control unit 122 and the display control unit 124 are configured by a processor to execute a program to execute the operations described above. In this example, the sensor control unit 122 and the display control unit 124 may be realized by a processor constituting the DP control unit 120 executing a program. In other words, the processor may function as the DP control unit 120, the display control unit 124 and the sensor control unit 122 by executing a program. Here, the processor can be paraphrased as a computer. The sensor control unit 122 and the display control unit 124 may be provided with a work memory for performing data processing, or may perform processing using the memory of the DP control unit 120.

Further, the display control unit 124 and the sensor control unit 122 may include programmed hardware such as DSP, FPGA. Further, the sensor control unit 122 and the display control unit 124 may be integrated to be configured of an SoC-FPGA. The DSP is an abbreviation for Digital Signal Processor. The FPGA is an abbreviation for Field Programmable Gate Array. The SoC is an abbreviation for System-on-a-Chip.

The power control unit 126 is a circuit coupled to the connector 11D and supplying power to each unit of the coupling device 10 and the image display unit 20 based on the power supplied from the connector 11D.

The power control unit 126 corresponds to the power supply unit together with the power supply units 229, 249.

The operation unit 140 detects operation of a switch, etc. included in the coupling device 10, and outputs data indicating the operation content to the DP control unit 120.

The sound processing unit 147 generates a sound signal according to the sound data input from the DP control unit 120. This sound data also includes sound data included in the playback signal input from the control device 300. The sound processing unit 147 includes an amplifier, and amplifies the generated sound signal and outputs the amplified sound signal to the coupling unit 145. This sound signal is output from the coupling unit 145 to the right earphone 32 and the left earphone 34 via the audio connector 36. The sound processing unit 147 generates sound data of the sound collected by the microphone 63 and outputs it to the DP control unit 120. The sound data output by the sound processing unit 147 may be processed by the sensor control unit 122 in the same manner as the detection data of the sensor included in the image display unit 20.

4. Control Device Configuration

Figure 4:
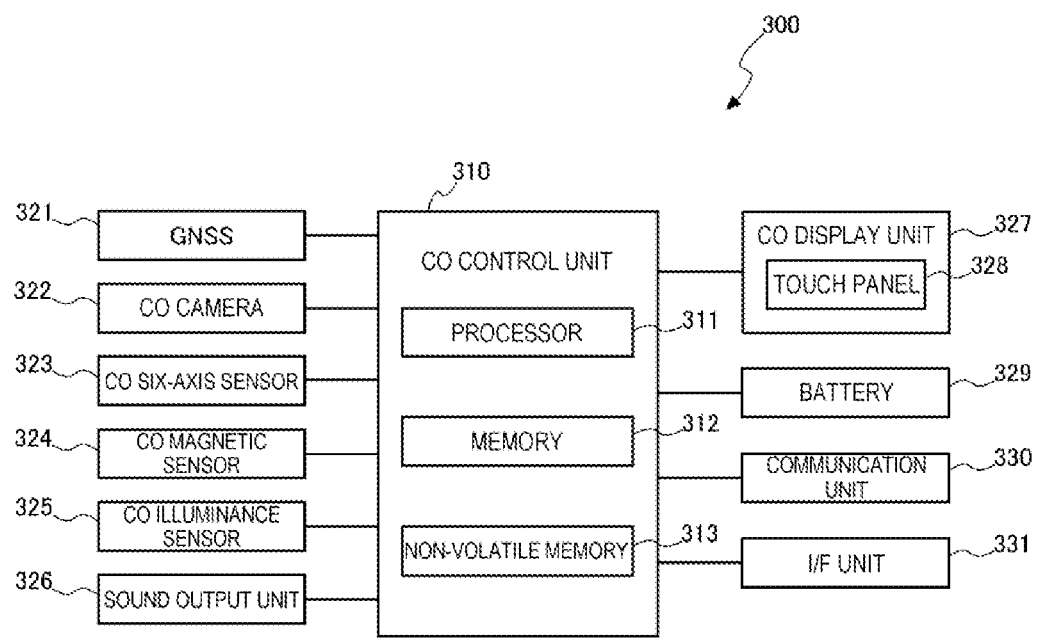
FIG. 4 is a block diagram of a control device.

FIG. 4 is a block diagram of the control device 300.

The control device 300 includes a CO control unit 310. The CO control unit 310 includes a processor 311 and a memory 312 and a non-volatile memory 313. The processor 311 is constituted by a CPU, a microcomputer, a DSP, etc., and controls each part of the control device 300 by executing a program. The memory 312 forms a work area of the processor 311. The non-volatile memory 313 is constituted by a semiconductor memory function unit, etc., and stores various types of data to be processed by the processor 311, such as a program executed by the processor 311. For example, the non-volatile memory 313 stores an operating system as a basic control program executed by the processor 311 and an application program running on the operating system. The non-volatile memory 313 stores data processed at the time of execution of the application program and data of the processing result. The CO control unit 310 may be a SoC in which the processor 311, the memory 312, and the non-volatile memory 313 are integrated.

A GNSS 321, a CO camera 322, a CO six-axis sensor 323, a CO magnetic sensor 324, a CO illuminance sensor 325, a sound output unit 326, a CO display 327, a battery 329, a communication unit 330 and an I/F unit 331 are coupled to the CO control unit 310.

The GNSS 321 uses the satellite positioning system to perform positioning, and outputs the position of the control device 300 to the CO control unit 310. The GNSS is a notation omitting the Global Navigation Satellite System.

The CO camera 322 is a digital camera provided at a main body of the control device 300, and is arranged adjacent to the touch panel 328, for example, and images the direction facing the touch panel 328. The CO camera 322 executes imaging according to the control of the CO control unit 310, and outputs the captured image data to the CO control unit 310.

The CO six-axis sensor 323 is a motion sensor including a three-axis acceleration sensor and a three-axis gyro sensor, and outputs detection data indicating a detection value to the CO control unit 310. The CO magnetic sensor 324 is, for example, a three-axis geomagnetic sensor, and outputs detection data indicative of the detection value to the CO control unit 310. The CO six-axis sensor 323 and CO magnetic sensor 324 may be an IMU in which each of the above sensors is modularized, or may be a module in which the CO six-axis sensor 323 and the CO magnetic sensor 324 are integrated.

The CO illuminance sensor 325 receives the outside light and outputs the detection data indicating a detection value corresponding to an amount of the received light or an intensity of the received light to the CO control unit 310.

The sound output unit 326 includes a speaker, and outputs a sound from the speaker in accordance with the control of the CO control unit 310. The sound output unit 326 may include an amplifier that amplifies the sound signal output by the CO control unit 310 and outputs the amplified sound signal to a speaker. When the CO control unit 310 is configured to output digital sound data, the sound output unit 326 may include a D/A converter that converts digital sound data to an analog sound signal.

The CO display unit 327 has the touch panel 328, and displays characters and images on the touch panel 328 in accordance with the control of the CO control unit 310.

The battery 329 is a secondary battery built into the main body of the control device 300, supplies power to each part of the control device 300, and supplies power to the coupled HMD 100.

When the HMD 100 is coupled to the I/F unit 331, the CO control unit 310 negotiates with the HMD 100 to determine the power supplied to the HMD 100. The negotiation is a process for performing, for example, a power roll setting, a setting of the amount of power to be transferred, etc. The power roll is a power source that functions as a supply source to supply power or a power sink that receives power from a power source.

The CO control unit 310 supplies the power determined by the negotiation to the HMD 100 via the I/F unit 331.

The battery 329 and CO control unit 310 correspond to the first supply unit.

The communication unit 330 corresponds to a wireless communication protocol such as Bluetooth or Wi-Fi, and performs wireless communication with a device external to the display system 1. The Bluetooth and Wi-Fi are registered trademarks. The communication unit 330 may be configured to perform mobile data communication using a mobile communication network such as LTE or a fifth generation mobile communication system. The LTE is a registered trademark.

The I/F unit 331 includes a connector (not illustrated) to which a data communication cable is coupled, and an interface circuit that executes a communication protocol conforming to various communication standards by the connector. For example, the I/F unit 331 includes a connector and an interface circuit conforming to the USB standard, and transmits and receives data through the USB cable 46 and supplies power to the HMD 100.

The non-volatile memory 313 stores content data.

The CO control unit 310 plays the content data and generates a playback signal including a video and a sound. The CO control unit 310 transmits the generated playback signal to the HMD 100 via the I/F unit 331.

5. Reboot when an Abnormality is Detected in the HMD 100

The DP control unit 120 executes an abnormality detection process for detecting an abnormality of a device included in the HMD 100 for each preset set time. The device for detecting the abnormality process includes, for example, a sensor such as the DP illuminance sensor 65, the temperature sensors 217, 237, the distance sensor 64, the DP six-axis sensor 235, the DP magnetic sensor 239, and the DP outer camera 61, the sound processing unit 147, etc.

The DP control unit 120 determines whether the driver that drives the device is accessible, and whether a value indicating an abnormality is written in the register in which the value indicating the driver status is written, to execute the abnormality detection process.

When the device for detecting an abnormality is a sensor, the DP control unit 120 determines whether a sensor value input from the sensor indicates an abnormal value, to detect an abnormality of the device.

Upon detecting device in which abnormality is occurring, the DP control unit 120 determines whether the DP six-axis sensor 235 is included in the device that detects the abnormality. The DP control unit 120 determines whether the image display unit 20 is mounted on the head of the user U based on the sensor value of the DP six-axis sensor 235, and thus, when an abnormality occurs in the DP six-axis sensor 235, it cannot be determined from the sensor value of the DP six-axis sensor 235 whether the image display unit 20 is mounted on the head of the user U, and the procedure for rebooting thee device to be executed after that is different. Thus, the DP control unit 120 determines whether an abnormality is occurring in the DP six-axis sensor 235.

When the DP control unit 120 does not include the DP six-axis sensor 235 in the device in which the abnormality occurs, the DP control unit 120 determines whether the image display unit 20 is mounted on the head of the user U based on the sensor value of the DP six-axis sensor 235.

When the sensor value input from, the DP six-axis sensor 235 does not change for a certain amount of time, the DP control unit 120 determines that the image display unit 20 is not mounted on the head of the user U. When there is a change in the sensor value input from the DP six-axis sensor 235, the DP control unit 120 determines that the image display unit 20 is mounted on the head of the user U.

When an abnormality is detected in the device, the DP control unit 120 reboots a driver including the driver of the device that detects the abnormality. The DP control unit 120 includes a first reboot mode and a second reboot mode as a reboot mode.

The first reboot mode is a mode of reboot executed when the user U is not wearing the image display unit 20 on the head thereof.

The second reboot mode is a mode of reboot executed when it is determined that the user U is wearing the image display unit 20 on the head, or when an abnormality has occurred in the DP six-axis sensor 235 and it cannot be determined whether the image display unit 20 is mounted on the head of the user U.

When executing the first reboot mode, the DP control unit 120 reboots the device that detects the abnormality and the display driver 135 in accordance with a first order. The first order is an order of reboot of the display driver 135 after rebooting the device driver of the device that detects the abnormality.

When the DP control unit 120 executes the second reboot mode, the DP control unit 120 reboots the display driver 135 and the device that detects the abnormality in accordance with a second order. The second order is an order of reboot of the device driver of the device that detects the abnormality after rebooting the display driver 135.

When executing the second reboot mode, the DP control unit 120 may determine whether an abnormality has occurred in the display driver 135, and may reboot the display driver 135 in a case where an abnormality occurs in the display driver 135. Further, when executing the second reboot mode, the DP control unit 120 may reboot the display driver 135 without determining whether an abnormality has occurred in the display driver 135, and then reboot the device driver of the device that detects the abnormality.

The image display unit 20 functions as a notification unit. The image display unit 20 includes the right display unit 22 and the left display unit 24 as a function unit for performing notification operation, and a sound output unit. The sound output unit includes the sound processing unit 147, the right earphone 32, and the left earphone 34.

When the DP control unit 120 detects the abnormality of the device and executes the first reboot mode, the DP control unit 120 first causes the image display unit 20 to display a guide display in a case where the device in which the abnormality occurs is a driver that drives the sound output unit. This guide display includes guides of the abnormality being occurred in the sound output unit and the sound output unit being rebooted.

Further, when the DP control unit 120 detects the abnormality in the device and the display driver 135 and executes the second reboot mode, the DP control unit 120 causes the image display unit 20 to display the guide display after rebooting the display driver 135, When the device in which the abnormality occurred is not a sound output unit, the DP control unit 120 may reboot the display driver 135 after outputting a sound guide to the sound output unit.

A time required until the display driver 135 is rebooted since the device abnormality is detected is shorter in the second reboot mode than in the first reboot mode. That is, when executing the first reboot mode, the display driver 135 is rebooted after rebooting the driver of the device that detects the abnormality. Further, when executing the second reboot mode, the driver of the device that detects the abnormality is rebooted after rebooting the display driver 135. Thus, the time required until the display driver 135 is rebooted since the device abnormality is detected is shorter in the second reboot mode than in the first reboot mode.

Figure 5:
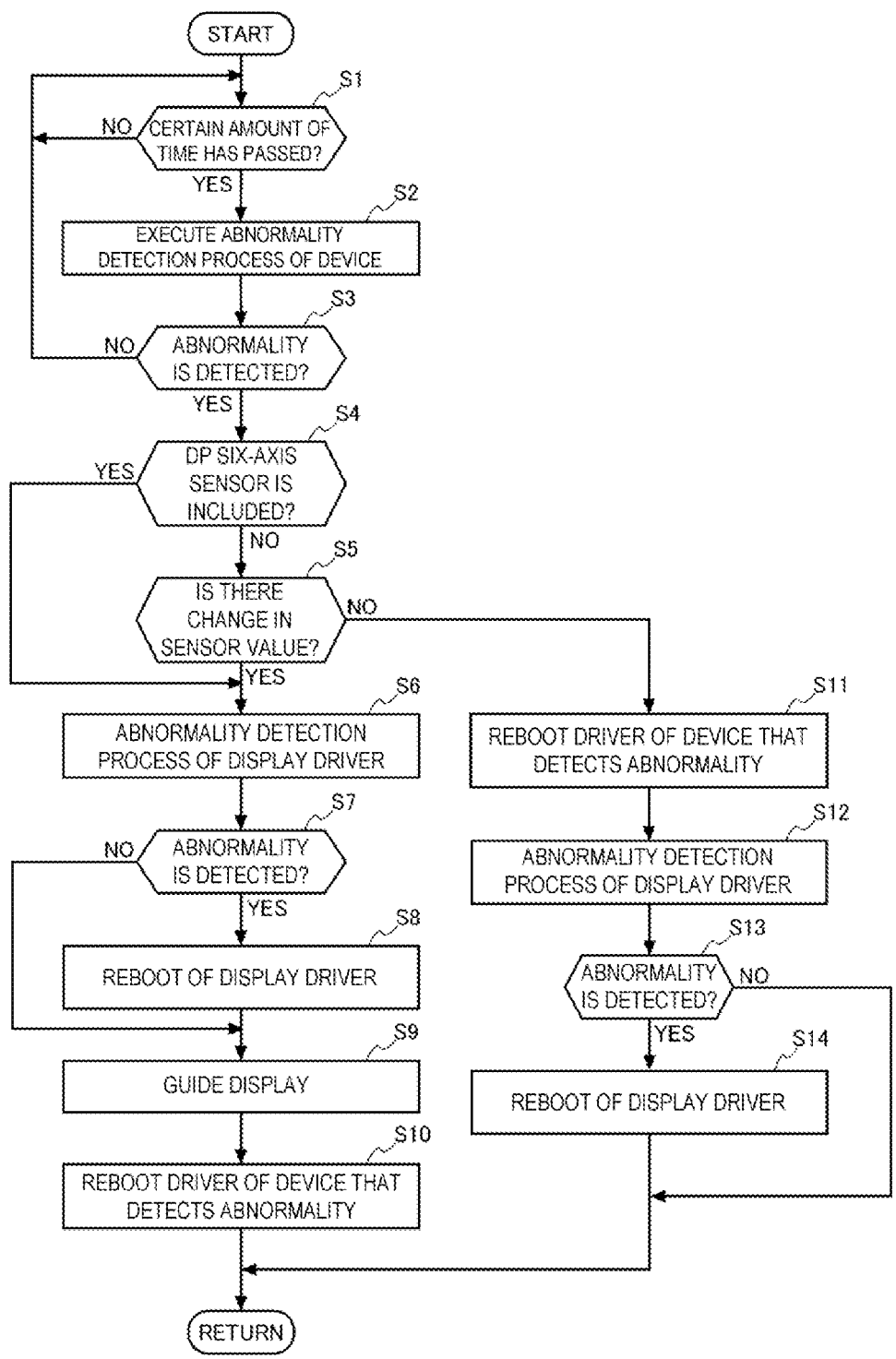
FIG. 5 is a flowchart illustrating operation of a head-mounted display apparatus.

FIG. 5 is a flowchart illustrating operation of the DP control unit 120.

The operation of the DP control unit 120 will be described with reference to the flowchart illustrated in FIG. 5.

First, the DP control unit 120 determines whether a certain amount of time has passed from the previous abnormality detection process (step S1). When the certain amount of time has not elapsed since the previous abnormality detection process (step S1/NO), the DP control unit 120 waits until the certain amount of time elapses.

When a certain amount of time has elapsed since the previous abnormality detection process was executed (step S1/YES), the DP control unit 120 executes the abnormality detection process of the device (step S2). The DP control unit 120 determines whether the driver that drives the device is accessible, and whether a value indicating an abnormality is written in the register in which the value indicating the driver status is written, to execute the abnormality detection process. Step S2 corresponds to a first detection step.

The DP control unit 120 determines whether an abnormality is detected by the abnormality detection process (step S3). When the DP control unit 120 does not detect an abnormality by the abnormality detection process (step S3/NO), the DP control unit 120 returns to the determination in step S1.

When the DP control unit 120 detects the abnormality by the abnormality detection process (step S3/YES), the DP control unit 120 determines whether the device that detects the abnormality includes the DP six-axis sensor 235 (step S4).

When the device that detects the abnormality includes the DP six-axis sensor 235 (step S4/YES), the DP control unit 120 transitions to the process of step S6 and starts the abnormality detection process of the display driver 135 (step S6). Additionally, when the device that detects the abnormality does not include the DP six-axis sensor 235 (step S4/NO), the DP control unit 120 determines whether there is a change in the sensor value input from the DP six-axis sensor 235 (step S5). The determination of step S5 corresponds to a second detection step.

When there is no change in the sensor value of the DP six-axis sensor 235 (step S5/NO), the DP control unit 120 determines that the user U does not wear the image display unit 20 on the head thereof. In this case, the DP control unit 120 executes the first reboot mode. When executing the first reboot mode, first, the DP control unit 120 reboots the driver of the device that detects the abnormality in step S3 (step S11). Thereafter, the DP control unit 120 executes the abnormality detection process of the display driver 135 (step S12). The DP control unit 120 determines whether the display driver 135 can be accessed and whether a value indicating an abnormality is written in the register in which the value indicating the state of the display driver 135 is written, to determine whether an abnormality has occurred in the display driver 135. When the DP control unit 120 determines that the abnormality does not occur in the display driver 135 (step S13/NO), the DP control unit 120 returns to the determination in step S1. When the DP control unit 120 determines that the abnormality has occurred in the display driver 135 (step S13/YES), the DP control unit 120 reboots the display driver 135 (step S14). Steps S11 to S14 correspond to a first reboot step.

Additionally, when there is a change in the sensor value of the DP six-axis sensor 235 (step S5/YES), the DP control unit 120 determines that the user U wear the image display unit 20 on the head thereof. In this case, the DP control unit 120 executes a second reboot mode. When executing the second reboot mode, first, the DP control unit 120 executes the abnormality detection process of the display driver 135 (step S6). The DP control unit 120 determines whether the display driver 135 can be accessed and whether a value indicating an abnormality is written in the register in which the value indicating the state of the display driver 135 is written, to determine whether an abnormality has occurred in the display driver 135.

When the DP control unit 120 determines that the abnormality has occurred in the display driver 135 (step S7/YES), DP control unit 120 reboots the display driver 135 (step S8). When the display driver 135 is rebooted, the DP control unit 120 causes the image display unit 20 to display the guide display (step S9). This guide display includes information indicating the device that detects the abnormality and that the return process from the abnormal state is executed. The DP control unit 120 acquires OSD data stored in the non-volatile storage unit 130, and causes the acquired OSD data to be displayed on the image display unit 20 to display the guide display.

When the guide display is displayed, the DP control unit 120 reboots the driver of the device that detects the abnormality in step S3 (step S10). Steps S8, S9, and S10 correspond to a second reboot step.

As described above, the HMD 100 according to the present exemplary embodiment is an image display device mounted on the head of the user U, and includes the image display unit 20, the DP six-axis sensor 235, and the DP control unit 120.

The image display unit 20 includes a notification unit that is mounted on the head of the user U and notifies the detection of abnormality.

The DP control unit 120 operates as a first detection unit for detecting an abnormality of the HMD 100.

The DP six-axis sensor 235 functions as a second detection unit configured to detect whether the image display unit 20 is mounted on the head of the user U.

The DP control unit 120 reboots the HMD 100 in accordance with the first order when mounting of the image display unit 20 on the head is not detected by the DP six-axis sensor 235, and an abnormality of the HMD 100 is detected. Additionally, the DP control unit 120 executes the second reboot mode for rebooting the HMD 100 in accordance with the second order when mounting of the image display unit 20 on the head is detected by the DP six-axis sensor 235, and an abnormality of the HMD 100 is detected.

The order of reboot of the display driver 135 that controls the image display unit 20 in the second order is set before the order of reboot of the display driver 135 in the first order.

Accordingly, when the image display unit 20 is mounted on the head of the user U, the timing at which the display driver 135 is rebooted can be accelerated, whereby the delay of the notification timing to the user U can be reduced.

Also, a time interval to reboot the display driver 135 from the start of the second reboot mode is shorter than a time interval to reboot the display driver 135 from the start of the first reboot mode.

The timing at which the display driver 135 is rebooted can be accelerated, whereby the delay of the notification timing to the user U can be reduced.

When the abnormality of the HMD 100 is detected, the DP control unit 120 determines whether the abnormality has occurred in the display driver 135, and executes the second reboot mode in a case where the display driver 135 determines that the abnormality has occurred.

Accordingly, it is possible to reduce the delay of the notification timing in a case where the occurrence of abnormality is displayed on the image display unit 20 and a notification is performed by preferentially rebooting the display driver 135 when an abnormality occurs in the display driver 135.

The image display unit 20 includes, as an notification unit, the right display unit 22 and the left display unit 24 that display an image to be visually recognized by the user U, and the sound output unit configured to output a sound. The sound output unit includes the sound processing unit 147, the right earphone 32, and the left earphone 34.

When the DP control unit 120 determines that the abnormality has occurred in the display driver 135, the DP control unit 120 notifies the occurrence of the abnormality by the sound output unit.

When the DP control unit 120 determines that the abnormality has occurred in the sound output unit, the DP control unit 120 notifies the occurrence of the abnormality by the display driver 135.

Therefore, since the notification is performed using the notification unit in which no abnormality has occurred, the delay of the notification timing to the user U can be reduced.

When the DP control unit 120 determines that the abnormality has occurred in the display driver 135, the DP control unit 120 reboots the display driver 135 before the sound output unit.

When the DP control unit 120 determines that the abnormality has occurred in the sound output unit, the DP control unit 120 reboots the sound output unit before the display driver 135.

Accordingly, it is possible to preferentially reboot the display driver 135 or the sound output unit that is determined that the abnormality has occurred.

The present disclosure is not limited to the configuration described in each of the above exemplary embodiments, and can be implemented in various aspects without departing from the gist thereof.

For example, the HMD 100 has been exemplified as an example of an image display device, but the present disclosure is not limited to this, and various image display devices can be adopted. For example, as the image display unit 20, an image display unit worn like a hat, for example, may be adopted. Such an image display unit may include a display unit configured to display images corresponding to the left eye LE of the user U and a display unit configured to display images corresponding to the right eye RE of the user U. Additionally, the image display device in the present disclosure may be configured, for example, as a head-mounted display mounted on a vehicle such as a car, and an airplane. Further, the display device may be configured, for example, as a head-mounted display built into a body protector tool such as a helmet. In such a case, a portion for positioning the device with respect to the body of the user U, and a portion positioned with respect to the portion described earlier can be a mounting section.

The HMD 100 is an example of an image display device to be applied to the present disclosure, and is not limited to the configuration illustrated in FIG. 3. For example, in the above exemplary embodiment, the configuration in which the image display unit 20 and the coupling device 10 are separated has been described as an example, however, it is also possible that the coupling device 10 and the image display unit 20 are integrally configured and mounted on the head of the user U. Further, the configuration of the optical system of the image display unit 20 is optional, and for example, an optical member positioned in front of the eye of the user U and overlapping some or all of the field of view of the user U may be used. Alternatively, a scanning optical system that scans laser light etc. to obtain imaging light may be adopted. Alternatively, without being limited to a configuration that light-guides the imaging light inside the optical member, the configuration may only have a function of refracting and/or reflecting the imaging light toward the eye of the user U.

The image display device may employ a liquid crystal monitor or a liquid crystal television that displays an image on the liquid crystal display panel. A display device including a plasma display panel, a micro LED display panel, an inorganic EL display panel, a quantum dot light emitting display panel, and an organic EL display panel may be used. In this case, the display panel corresponds to the display unit of the present disclosure. A projector that projects the imaging light onto a screen, etc. may be used as the display device.

For example, in the HMD 100 illustrated in FIG. 3, the coupling device 10 may be configured using the USB-Type C connector, the USB-Type C controller, and a USB hub. In this case, the DP outer camera 61 and other sensors may be coupled to the USB hub. Further, as a controller for controlling display of the right display unit 22 and the left display unit 24 in the image display unit 20, the FPGA that outputs the display data to the right display unit 22 and the left display unit 24 may be arranged in either the right display unit 22 or the left display unit 24. In this case, the coupling device 10 may include a bridge controller that the USB-Type C controller and the FPGA. Additionally, the image display unit 20 may have a configuration in which the DP six-axis sensor 235, the DP magnetic sensor 237, the EEPROM 215, etc. are mounted on the same substrate as the FPGA. The arrangement of the other sensors can also be modified accordingly. For example, the distance sensor 64 and the DP illuminance sensor 65 may be arranged at positions suitable for measurement or detection, and may be coupled to the FPGA or the USB-Type C controller.

There is no particular limitation on the specific specifications of the image display device including the OLED units 221, 241, for example, the OLED units 221, 241 may have a common configuration.

At least some of the functional blocks illustrated in FIGS. 3 and 4 may be achieved in the form of hardware or may be achieved by a cooperation of hardware and software, and, is not limited to a configuration in which independent hardware resources are arranged as illustrated in the drawings.

Further, the flowchart illustrating the processing of the HMD 100 illustrated in FIG. 5 is divided according to the main processing contents in order to make the processing of the DP control unit 120 easy to understand. The present disclosure is not limited by the manner and name of division of the processing unit illustrated in the flowcharts of FIG. 5. The processing of the DP control unit 120 can be divided into more processing units in accordance with a processing content, and can be divided such that one processing unit includes more processing. An order of the processing in the above-described flowchart is also not limited to the illustrated example. For example, it is also possible to omit step S1 of determining whether a certain amount of time has passed from the previous abnormality detection process, step S2 of executing the abnormality detection process of the device, and a step S3 of determining whether an abnormality is detected by the abnormality detection process. In other words, the DP control unit 120 executes a step S4 of determining whether the DP six-axis sensor 235 is included in the device that detects the abnormality in a case where an abnormality occurs in the device included in the HMD 100, rather than executing a process for periodically detecting an abnormality on a device included in the HMD 100.

Further, when the computer provided by the HMD 100 is used to implement the reboot method for the display device, the program executed on the computer can be configured in the form of a recording medium or a transmission medium transmitting the program. As the recording medium, a magnetic or optical recording medium or a semiconductor memory function unit can be used. The recording medium described above may be non-volatile storage devices such as a RAM, a ROM, and an HDD, which is an internal storage device included in the server device.

Further, as an example of the notification unit of the present exemplary embodiment, the right earphone 32 and the left earphone 34 correspond to the sound processing unit 147, but the sound output processing unit is not limited thereto. For example, in place of the right earphone 32 and the left earphone 34, a speaker may be used to guide the user U that an abnormality has occurred in the device included in the HMD 100. In this case, the speaker is arranged at the front frame 27, the right holding part 21, and the left holding part 23.

What is claimed is:

1. An image display device mounted on a head of a user, the device comprising:
    a notification unit that notifies detection of an abnormality in the image display device;
    a detection unit that detects whether the image display device is mounted on the head of the user; and
    a control unit that
        detects that the abnormality in the image display device occurs and determines whether to execute a first mode or a second mode,
        in response that the detection unit detects that the image display device is not mounted on the head of the user, executes a first mode for rebooting the image display device in accordance with a first order, and
        in response that the detection unit detects that the image display device is mounted on the head of the user, executes a second mode for rebooting the image display device in accordance with a second order,
    wherein
    an order in which the notification unit is rebooted in the second order is earlier than an order in which the notification unit is rebooted in the first order.

2. The image display device according to claim 1, wherein,
    the control unit determines whether the notification unit has the abnormality, and
    when the control unit determines that the notification unit has the abnormality, the control unit executes the second mode.

3. The image display device according to claim 1, wherein the notification unit includes:
    a display unit that displays an image to notify occurrence of the abnormality; and
    a sound output unit that outputs a sound to notify occurrence of the abnormality,
    when the control unit determines that the display unit has the abnormality, the sound output unit outputs the sound, and
    when the control unit determines that the sound output unit has the abnormality, the display unit displays the image.

4. The image display device according to claim 3, wherein
    when the control unit determines that the display unit has the abnormality, the control unit reboots the display unit before the sound output unit, and
    when the control unit determines that the sound output unit has the abnormality, the control unit reboots the sound output unit before the display unit.

5. An image display device mounted on a head of a user, the device comprising:
    a notification unit that notifies detection of an abnormality in the image display device;
    a detection unit that detects whether the image display device is mounted on the head of the user; and
    a control unit that
        detects that the abnormality in the image display device occurs and determines whether to execute a first mode or a second mode,
        in response that the detection unit detects that the image display device is not mounted on the head of the user, executes a first mode for rebooting the image display device in accordance with a first order, and
        in response that the detection unit detects that the image display device is mounted on the head of the user, executes a second mode for rebooting the image display device in accordance with a second order,
    wherein
    time until which the notification unit is rebooted in the first order is longer than time until which the notification unit is rebooted in the second order.

6. The image display device according to claim 5, wherein,
    the control unit determines whether the notification unit has the abnormality, and
    when the control unit determines that the notification unit has the abnormality, the control unit executes the second mode.

7. The image display device according to claim 5, wherein the notification unit includes:
    a display unit that displays an image to notify occurrence of the abnormality; and
    a sound output unit that outputs a sound to notify occurrence of the abnormality,
    when the control unit determines that the display unit has the abnormality, the sound output unit outputs the sound, and
    when the control unit determines that the sound output unit has the abnormality, the display unit displays the image.

8. The image display device according to claim 7, wherein
when the control unit determines that the display unit has the abnormality, the control unit reboots the display unit before the sound output unit, and
when the control unit determines that the sound output unit has the abnormality, the control unit reboots the sound output unit before the display unit.

9. A control method for an image display device mounted on a head of a user, the method comprising:
detecting that an abnormality in a notification unit that notifies the abnormality occurs;
determining whether to reboot the image display device in accordance with a first order or a second order according to a detection of whether the image display device is mounted on the head of the user;
in response that the image display device is detected not being mounted on the head of the user, rebooting the image display device in accordance with the first order; and
in response that the image display device is detected being mounted on the head of the user, rebooting the image display device in accordance with the second order,
wherein time until which the notification unit is rebooted in the second order is earlier than time until which the notification unit is rebooted in the first order.

* * * * *